United States Patent
Ferrari et al.

(10) Patent No.: US 11,365,151 B2
(45) Date of Patent: Jun. 21, 2022

(54) ACCELERATING ADMIXTURE FOR HYDRAULIC COMPOSITIONS

(71) Applicant: MAPEI SPA, Milan (IT)

(72) Inventors: Giorgio Ferrari, Milan (IT); Alberto Brocchi, Milan (IT); Marco Squinzi, Milan (IT)

(73) Assignee: MAPEI SPA, Milan (IT)

( * ) Notice: Subject to any disclaimer, the term of this patent is extended or adjusted under 35 U.S.C. 154(b) by 127 days.

(21) Appl. No.: 16/650,003

(22) PCT Filed: Sep. 21, 2018

(86) PCT No.: PCT/IB2018/057284
§ 371 (c)(1),
(2) Date: Mar. 24, 2020

(87) PCT Pub. No.: WO2019/058313
PCT Pub. Date: Mar. 28, 2019

(65) Prior Publication Data
US 2020/0277229 A1    Sep. 3, 2020

(30) Foreign Application Priority Data
Sep. 25, 2017 (IT) .................. 102017000107064

(51) Int. Cl.
| | | |
|---|---|---|
| *C04B 22/06* | (2006.01) | |
| *C04B 24/38* | (2006.01) | |
| *C04B 28/04* | (2006.01) | |
| *C04B 103/00* | (2006.01) | |
| *C04B 103/14* | (2006.01) | |

(52) U.S. Cl.
CPC ........... *C04B 22/064* (2013.01); *C04B 24/383* (2013.01); *C04B 28/04* (2013.01); *C04B 2103/0079* (2013.01); *C04B 2103/14* (2013.01); *C04B 2201/10* (2013.01)

(58) Field of Classification Search
CPC ..... C04B 22/064; C04B 24/383; C04B 28/04; C04B 2103/0079; C04B 2103/14; C04B 2201/10
See application file for complete search history.

(56) References Cited

U.S. PATENT DOCUMENTS

| | | |
|---|---|---|
| 5,709,743 A | 1/1998 | Leture et al. |
| 2004/0040474 A1 | 3/2004 | Perez-Pena et al. |
| 2014/0221534 A1 | 8/2014 | Osborne |

FOREIGN PATENT DOCUMENTS

| | | | |
|---|---|---|---|
| WO | 2006043265 A2 | 4/2006 | |
| WO | 2015130284 A1 | 9/2015 | |
| WO | WO-2016169981 A1 * | 10/2016 | ......... C04B 40/0042 |

OTHER PUBLICATIONS

Search Report and Written Opinion of PCT/IB2018/057284 dated Jan. 17, 2019.

* cited by examiner

*Primary Examiner* — Anthony J Green
(74) *Attorney, Agent, or Firm* — Silvia Salvadori, P.C.; Silvia Salvadori

(57) ABSTRACT

The object of the present invention is a novel admixture comprising a hardening accelerator for hydraulic compositions based on Portland cement and other supplementary cementitious materials.

14 Claims, 2 Drawing Sheets

Figure 2. ESEM image of the sample of Comparative Example 2.
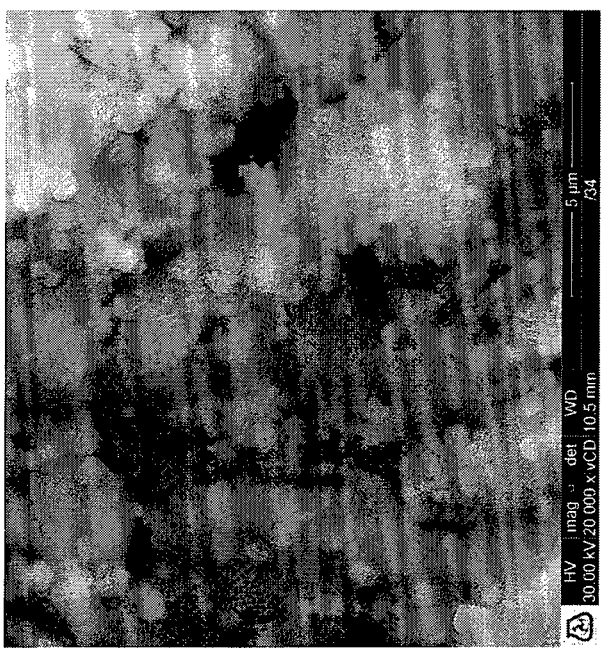
Figure 1. ESEM image of the sample of Example 4.

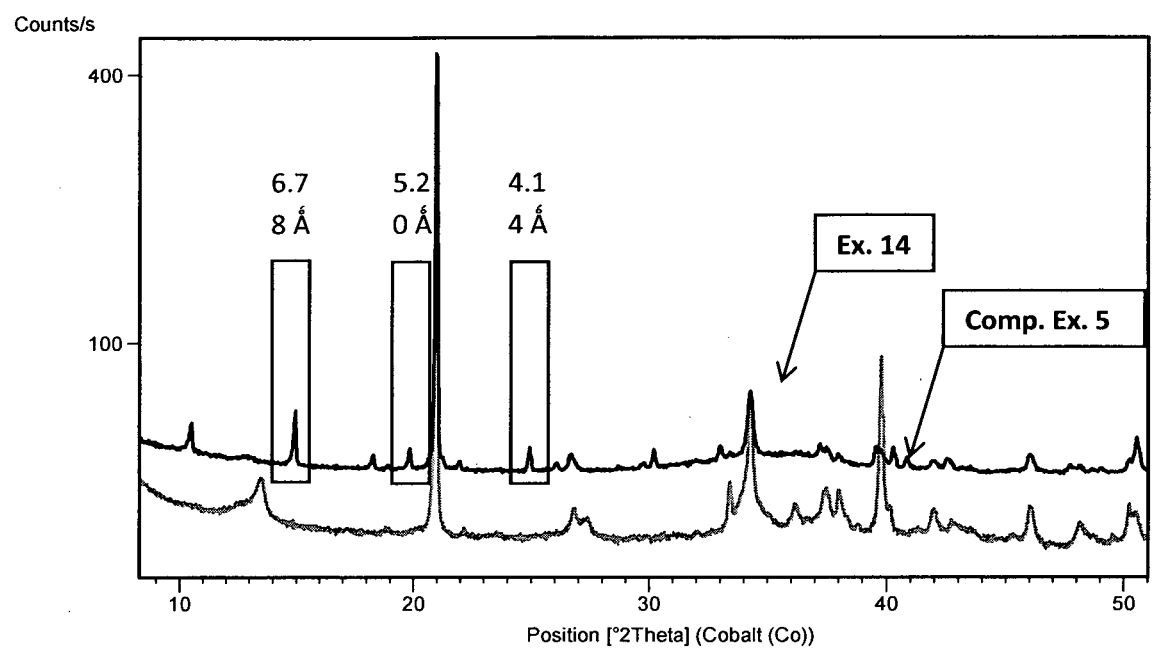
Figure 3. XRPD spectra of the sample of Example 14 (dark upper line) and sample of Comparative Example 5 (grey lower line).

ACCELERATING ADMIXTURE FOR HYDRAULIC COMPOSITIONS

This application is a U.S. national stage of PCT/IB2018/057284 filed on 21 Sep. 2018, which claims priority to and the benefit of Italian Application No. 102017000107064 filed on 25 Sep. 2017, the contents of which are incorporated herein by reference in their entireties.

The object of the present invention is a novel admixture comprising a hardening accelerator for hydraulic compositions based on Portland cement and other supplementary cementitious materials.

PRIOR ART

Hardening accelerators are admixtures which are widely used in the construction industry to increase the mechanical strength of cement mixes at short curing times. Their use is dictated by the need for faster removal of the steel forms, and consequently faster recovery and reuse thereof, or to enable the work to advance more quickly if said structures are already subjected to a considerable load a few days after placement. The use of accelerating admixtures is most widespread in the geographical areas and periods with the coldest climates, because low temperatures slow the cement hydration reaction, with the result that longer curing times are needed for the structure to reach sufficient mechanical strength values to be self-supporting. Accelerating admixtures increase mechanical strength at short curing times because they accelerate the cement hydration reaction rate, but do not affect the total amount of cement that reacts with water at longer times, and therefore do not substantially alter the final mechanical strength of the product.

Many inorganic compounds are known to have accelerating properties, including chlorides, fluorides, carbonates, nitrites, nitrates, thiosulphates and thiocyanates. The organic compounds used as accelerators include triethanolamine, diethanolamine, urea, glyoxal and formate.

Chlorides and nitrates, in particular calcium chloride and calcium nitrate, are among the most effective accelerators, but have the drawback of promoting corrosion of the reinforcing bars, so that their use in reinforced concrete is precluded. Calcium formate does not present said risk, and acts as a hardening accelerator when a small percentage thereof by weight of the cement mass is added; the greatest limit on its use lies in its low solubility in water, which prevents its use in aqueous solution; it must therefore be used in powder form to be added directly to the concrete at the time of mixing.

Other organic accelerators, such as triethanolamine, act as cement hydration accelerators at low doses (0.025 per cent by weight of the cement weight), whereas they reduce the hydration rate at higher doses (0.06 per cent by weight of the cement weight).

The action of accelerators is mainly performed towards the silicate phases that constitute the cement, in particular tricalcium silicate, $3CaO \cdot SiO_2$, the major constituent of Portland cement. The importance of tricalcium silicate, which is abbreviated to $C_3S$ ($C=CaO$, $S=SiO_2$) in cement chemistry, is due to the fact that it is the most abundant constituent of Portland cement (50 to 70 per cent), and especially because it contributes to the hardening of the cementitious paste. Due to the reaction of this phase with water, the cement hardens and is transformed, in a few hours, from a pourable plastic mass to a hardened conglomerate able to withstand considerable mechanical stresses. The hydration reaction of tricalcium silicate is as follows:

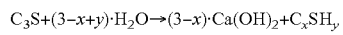

The product that forms by hydration of $C_3S$ with water, namely calcium silicate hydrate, is a compound of indeterminate composition, wherein the proportions of the various constituents ($C=CaO$, $S=SiO_2$, $H=H_2O$) vary according to time and curing conditions. For this reason, and the absence of a well-defined crystalline structure, said compound is generically indicated by the name of "calcium silicate hydrate gel" and the notation C-S-H. C-S-H is a porous product that covers the cement granules and is characterised by a large surface area; it presents as a mass of fibrous particles with a length of up to a few microns and a thickness of a few tenths of a micron, the interlinking of which contributes to determining the binding properties of the cement.

The action mechanism of the accelerators described above is not yet fully understood, but said compounds are believed to accelerate the $C_3S$ hydration reaction by means of surface adsorption processes, ion chelation, precipitation of insoluble salts, and modification of the microstructure of the hydrated phases. An extensive review of the scientific and patent literature on hardening accelerators will be found in Collepardi, M., "Scienza e Tecnologia del Calcestruzzo", *Hoepli Editore, Milano*, 1987, pp. 335-337, in Ramachandran, V. S., "Concrete Admixtures Handbook—Second edition", *Noyes Publications*, Park Ridge, N.Y., 1995, pp. 185-273 and pp. 1047-1049, and Cheung, J. et al., "Impact of Admixtures on the Hydration Kinetics of Portland Cement", *Cement and Concrete Research*, 41, 2011, pp. 1289-1309.

It has been reported that C-S-H can act as a $C_3S$ hydration accelerator (Kondo, R., Daimon, M., J. Am. Ceram. Soc. 52, 1969). These results were recently confirmed using synthetic C-S-H, obtained by precipitation from a calcium nitrate solution and a sodium metasilicate solution (Thomas, J. J. et al., *J. Phys. Chem.*, 113, 2009, pp. 4327-4334). It has been demonstrated that the addition of said precipitate to Portland cement pastes acts as a crystallisation seed for the C-S-H product by hydration of the $C_3S$ of the cement, accelerating its nucleation and precipitation, both on the cement particles and in the capillary porosity of the mix, with consequent accelerated development of mechanical strength and improved durability characteristics of the hardened conglomerates.

WO2010026155 describes a process for the production of C-S-H useful as a hardening accelerator, wherein the precipitation of calcium silicate hydrate from aqueous solutions containing calcium ions and silicate or silica ions is conducted in the presence of a branched polymer superplasticiser for cement mixes ("comb polymer"). Examples of said compounds are polycarboxylate ethers based on terpolymers of maleic acid, acrylic acid and vinyloxybutyl-polyethylene glycol-5800 with a molecular weight (Mw) of about 40,000 g/mol, terpolymers of maleic acid, acrylic acid and vinyloxybutyl-polyethylene glycol-12000 with a molecular weight (Mw) of about 73,000 g/mol, and polycarboxylate ethers based on copolymers of methacrylic acid and methoxy polyethylene glycol methacrylate-5,000 with a molecular weight (Mw) of about 40,000 g/mol.

One drawback of the method described in WO2010026155 is the presence of high concentrations of alkali and nitrate anions, which remain in the end product as reaction by-products. The alkali metals present represent a potential cause of concrete degradation, because they can react with the fraction of amorphous silica present in some types of aggregates, giving rise to expansion reactions (ASR—Alkali Silica Reaction) which give rise to tensions in the hardened concrete, to the point of causing cracks and degradation the structure. Nitrate anions corrode the reinforcing bars, which rules out the use of said admixtures in the production of reinforced concrete.

A commercial example of a product made by said method is the product Master X-Seed 100 (BASF), the data sheet whereof declares a 5% alkali content.

U.S. Pat. No. 5,709,743 claims the use of a setting and hardening accelerator for siliceous binders, in the form of a aqueous suspension, obtained by hydration and grinding of a suspension of a siliceous hydraulic binder. The admixture, based on the accelerating effect of C-S-H seeds, is obtained by hydrating Portland cement, or another hydraulic binder rich in silicate phases, at temperatures ranging from 5° C. to 90° C., in the presence of an amount of water such as to form a water to binder weight ratio (W/B) ranging from 0.6 and 25, and subjecting the resulting suspension to a grinding process in a micronising mill until the desired particle size is obtained. Alternatively, the hydration and grinding stages can be concomitant, and can be performed, for example, in a porcelain mill with corundum balls. The end product has a solid content ranging from 5% and 55% by weight, and sedimentation amounting to at least 60% of the initial height after 2 days.

The drawback of this method is the need to wet-grind the cement and water suspension, requiring large industrial mills, which involve considerable energy consumption and maintenance costs.

The hardening accelerators developed to date, which mainly act on the silicate phases of Portland cement, are not equally effective towards hydraulic systems wherein Portland cement is partly or wholly replaced with alternative binders, in particular with industrial by-products originating from other types of production, such as fly ash from coal-operated thermal power stations or ground-granulated blast furnace slag obtained in the cast iron manufacturing process, which are used to reduce the consumption of Portland cement.

These supplementary cementitious materials only contribute to the development of mechanical strength at longer curing times (60 days after mixing), whereas they make no such contribution at short curing times (24 hours or less). Consequently, no more than 15-20% of Portland cement can be replaced with supplementary cementitious materials, otherwise there will be an excessive initial delay in the concrete hardening stage and a reduction in mechanical properties at short curing times, leading to unacceptable slowing of the construction processes. In fact, until the poured concrete has reached sufficient mechanical strength values for it to be self-supporting, the steel forms cannot be removed, and construction work cannot proceed.

DESCRIPTION OF THE INVENTION

The present invention relates to a novel admixture based on C-S-H seeds in aqueous suspension, obtained from Portland cement or other hydraulic binders with a siliceous base, able to produce an accelerating admixture that is highly effective in promoting the rapid development of the mechanical strength of cement mixes and, at the same time, presents none of the drawbacks of the accelerating admixtures developed to date.

BRIEF DESCRIPTION OF THE DRAWINGS

FIG. 1 shows an image of the product disclosed in Example 4.

FIG. 2 shows an image of the product disclosed in Comparative Example 2.

FIG. 3 shows diffraction spectra of samples corresponding to the products disclosed in Example 14 and Comparative Example 5.

The invention relates to the process for obtaining said admixture. In particular the process according to the invention, unlike the method described in WO2010026155, does not introduce alkalis or nitrate ions into the end product, and therefore does not increase the risk of promoting the alkali-aggregate reaction and corrosion of the reinforcing bars when the product is used in concrete. Moreover, the process according to the invention, unlike U.S. Pat. No. 5,709,743, does not require a grinding stage to ensure the maximum efficacy of the C-S-H seeds and the stability of the resulting suspension. The admixture according to the invention, either alone or in formulation with sodium carbonate, is particularly effective in activating supplementary cementitious materials such as fly ash—and ground-granulated blast-furnace slag, promoting their hardening even when little or no Portland cement is present. This characteristic considerably increases the percentage substitution of supplementary cementitious materials in hydraulic compositions, without penalising mechanical strength at short curing times.

The crucial aspect of the invention is that the hydration reaction of Portland cement (or other hydraulic binder with a siliceous base) is conducted in aqueous suspension, in the presence of carboxylic acids or the calcium salts thereof, polyethanolamines or mixtures thereof. It has now surprisingly been found that by conducting the hydration reaction of the hydraulic binder in an aqueous solution of said compounds, in particular formic acid, acetic acid or the calcium salts thereof, monoethanolamine, diethanolamine and triethanolamine, isopropanolamine, triisopropanolamine, diethanolisopropanolamine or mixtures thereof, instead of in pure water as described in U.S. Pat. No. 5,709,743, the accelerating properties of the end product are surprisingly improved, and the resulting aqueous suspensions of the products thus obtained are perfectly stable and no longer object to sedimentation processes.

These results seem to be attributable to the formation of compounds between the calcium ions wherein the reaction medium is extremely rich and the organic substances (carboxylic acids or amino compounds), under the hydrothermal conditions that characterise the synthesis process giving rise to the formation of the products according to the present invention. These compounds, generically called MOFs (Metal-Organic Frameworks), are essentially crystalline materials consisting of metal ions coordinated with rigid organic binders to create one, two or three-dimensional structures with very high porosity. The empty space in the material can reach 90 per cent of the volume thereof, with very high internal surface areas, which may exceed 6000 $m^2$/gram (Zhou, H., Long, J. R. and Yaghi, O. M., Chem. Rev, 2012, 112 (2), pp. 673-674).

The amount of the carboxylic acids or calcium salts thereof and polyethanolamine to be used according to the invention varies within a wide range, from 2% to 40%, preferably from 5% to 25%, and even more preferably from 10% to 20% of the weight of the Portland cement or other mainly silicate-based hydraulic binders.

All types of Portland cement, and the other cements described in Standard UNI-EN 197-1:2006, can be conveniently used according to the invention. Examples of cements are those based only on clinker and gypsum (type CEM I), limestone cements (type CEM II/A-L, CEM II/B-L, CEM II/A-LL, CEM II/B-LL), blast-furnace slag cements (type CEM II/A-S, CEM II/B-S), and pozzolanic cements (type CEM IV/A, CEM IV/B). Cements with the highest silicate phase content are naturally preferable, because they can produce, by hydration, the maximum amount of C-S-H seeds. The amount of water needed to develop the binder hydration in a way which is useful for the purposes of the invention varies within a wide range, between a water/binder ratio ranging from W/B=1 to W/B=6, preferably from W/B=1.5 to W/B=4, and even more preferably from W/B=2 to W/B=3.

The hydration of the binder in the aqueous solution containing the compounds according to the invention is preferably conducted in stirred tanks or reactors, at atmospheric pressure and at temperatures ranging from 10° C. to 90° C., preferably from 20° C. to 80° C., and even more preferably from 40° C. to 60° C., for times ranging from 2 hours to 300 hours.

Stirring can be continuous or discontinuous, with anchor or rotor stirrers, which must be effective in order to guarantee the homogenisation of the mass during the reaction. Auxiliary ultradispersion systems can be conveniently associated with traditional stirring systems.

From the operational standpoint, the reactor or tank is filled with the established amount of water wherein the compound according to the invention is dissolved. The temperature is adjusted to the value established for the reaction, and the hydraulic binder is gradually added under stirring.

The hydration reaction can be conducted in the presence of auxiliary ingredients such as dispersing agents, viscosity-controlling agents or stabilisers, to give the end product the desired properties. The dispersing agents that can be used include, for example, gluconic acid and the salts thereof, polyethercarboxylate-based polymers, lignin sulphonate, condensates of naphthalene sulphonate and melamine sulphonate with formaldehyde, polysaccharide derivatives and phosphonated polymers. The viscosity-controlling agents that can be used are sodium carbonate, polysaccharide derivatives selected from the group comprising methylcellulose, hydroxyethylcellulose (HEC), hydroxypropylcellulose (HPC), methylhydroxyethylcellulose (MHEC), methylhydroxypropylcellulose (MHPC) and/or (co)polymers with an average molecular weight greater than 500,000 g/mol, preferably greater than 1,000,000 g/mol, containing structural units preferably derived from non-ionic monomers of (meth)acrylamide and sulphonated monomers, or modified polyureas. Hydroxycarboxylic acids or salts thereof, such as citric acid, malic acid or oxalic acid, can be used as stabilisers. Alternatively, said auxiliary ingredients can be added at the end of the hydration reaction.

The addition of sodium carbonate or sodium sulphate during or at the end of the hydration stage effectively promotes the hydraulic properties of supplementary cementitious materials such as fly ash, ground-granulated blast-furnace slag and calcined clays, even in the absence of Portland cement. In combination with sodium carbonate or sodium sulphate, the admixture according to the invention can therefore be conveniently used for the production of hydraulic mixes that do not use Portland cement, known as "geopolymers" or alkali-activated binders, namely binder systems wherein aluminosilicate structural units are condensed with the sodium ions originating from sodium carbonate. The usable amount of sodium carbonate to be added ranges from 3% to 40%, preferably from 5% to 30%, and even more preferably from 10% to 20% of the dry weight of the hydrated suspension.

It should be noted that the accelerator according to the invention, optionally combined with sodium carbonate or sodium sulphate, can be used as activator of mixes based on "geopolymer" binders, also in combination with the normal plasticising and superplasticising admixtures. This aspect represents a considerable improvement on the state of the art, because it is known that the common "geopolymer" activators, such as those based on alkali silicates and alkali hydroxides, are incompatible with the use of plasticisers and superplasticisers.

The accelerator according to the invention can be added to the concrete production unit, together with the mix water and other admixtures, or can be premixed, optionally in solid form after drying, with the other constituents of the mix, such as cement, fly ash or other supplementary cementitious materials. The accelerator according to the invention can also be added during the clinker grinding stage. The typical dose of the accelerator according to the invention can range from 1% to 60%, preferably from 2% to 45%, and even more preferably from 5% to 35% of the weight of the cementitious materials used for the production of the cement mix.

The detailed characteristics of the invention are described in the following examples.

EXAMPLE 1

56 g of calcium formate was dissolved in 1400 g of water at 80° C., and the resulting solution was maintained under stirring, with a mechanical stirrer, in a 2000 ml glass beaker, until the calcium formate was completely dissolved. 560 g of Portland cement type 52.5R, according to the classification of standard UNI-EN 197-1:2006, was added to said solution in 30 seconds at the temperature of 80° C. The characteristics of the 52.5R cement used are set out in the table below.

TABLE 1

Characteristics of 52.5R cement used

| Ingredient | Parameter | |
|---|---|---|
| | Unit of measurement | Value |
| C3S | % | 50.9 |
| C2S | % | 27.6 |
| C3A | % | 5.6 |
| C4AF | % | 11.1 |
| CaO | % | 1.6 |
| SO3 | % | 3.5 |
| Average particle size | μm | 9.94 |

The hydration reaction is continued, under stirring, at the temperature of 80° C. for 6 hours. During the reaction, the product remains in the form of a fluid suspension, the grey colour of which tends to become paler over time. At the end of the reaction, the product is cooled and transferred to a plastic container. About 2000 g of product is obtained, with a dry matter content of 32% measured at 105° C. to a constant weight.

COMPARATIVE EXAMPLE 1

560 g of the 52.5R cement of Table 1 was added to 1400 g of water at 80° C. by the same procedure as described in Example 1. The hydration reaction is continued, under stirring, for 6 hours, at the temperature of 80° C. During the reaction, the product remains in the form of a fluid suspension, the grey colour of which tends to become paler over time. At the end of the reaction, the product is cooled and transferred to a plastic container. About 1950 g of product is obtained, with a dry matter content of 31.5% measured at 105° C. to a constant weight.

EXAMPLE 2

The products of Example 1 and Comparative Example 1 were evaluated as hardening accelerators in plastic mortar tests, as specified in standard UNI-EN 197-1:2006, using standard sand and a sand/cement ratio=3. The cement used to make the plastic mortars was the same CEMI 52.5R cement as in Table 1. The superplasticising admixture Dynamon SP1 (Mapei), based on polyethercarboxylate-based polymers, was used to achieve the desired workability. All the mixes were made with a water/cement ratio W/C=0.42, counting any water introduced with the admixtures as mix water in the various cases.

After the spreading measurement, prismatic specimens with dimensions of 4 cm×4 cm×16 cm were made with the mortars, and left to cure under standard laboratory conditions (20° C. and 95% R/H). Their compressive strength was measured after 7 hours' and 24 hours' curing. The compositions and characteristics of the mortars are shown in Table 2 below. Two other two mixes (Mix 3 and Mix 4) were made by way of comparison. Mix 3 was made by adding separately to the product of Comparative Example 1 the same amount of calcium formate as introduced into the mix by the product of Example 1 (2.5 g). Mix 4 contains calcium formate only, in the same amount as introduced by Example 1 (2.5 g). The proportion of the admixtures of Example 1 and Comparative Example 1 was 6.2% dry matter as a percentage of the weight of the cement in both cases.

directly to the mix is also confirmed by the low strength values of Mix 4, containing calcium formate only, which develops a mechanical strength of only 1.4 MPa after 7 hours. After 24 hours' curing, all the specimens reach equivalent mechanical strength values, as was to be expected, since all the mixes have the same water/cement ratio.

The results of this example demonstrate that by conducting the hydration reaction of the hydraulic binder in a calcium formate solution (Example 1 according to the invention), instead of pure water (Comparative Example 1), the accelerating properties of the end product are surprisingly improved, and that said improvement greatly exceeds the effect of the mere combination of equivalent amounts of calcium formate and an admixture obtained by hydration of Portland cement in water alone, under the same conditions (Comparative Example 1).

EXAMPLE 3

In this example, the calcium formate (CaF) of the synthesis of Example 1 was replaced by other substances, according to the recipes set out in Table 3 below. In particular, 100% calcium acetate (CaAC) (Recipe 3A), diethanolamine (DEA) in 85% aqueous solution (Recipe 3B) and triethanolamine (TEA) in 85% aqueous solution (Recipe 3C) were used. The type of cement used is the same as that of Example 1, as are the synthesis methods. By way of comparison, a synthesis was conducted under the same conditions as the synthesis of Example 1, wherein the calcium formate was replaced by an equivalent amount of 100% calcium nitrate (CaN) (Recipe 3COMP), commonly used as a cement hydration accelerator.

TABLE 2

Composition and characteristics of plastic mortars containing the admixture according to the invention, and comparative tests

| Ingredient | Unit of measurement | Mix 1 | Mix 2 | Mix 3 | Mix 4 |
|---|---|---|---|---|---|
| 52.5R cement | g | 450 | 450 | 450 | 450 |
| Standard sand | g | 1350 | 1350 | 1350 | 1350 |
| Water | g | 129.8 | 128.4 | 128.4 | 189 |
| Example 1 | g | 87.1 | — | — | — |
| Comparative Example 1 | g | — | 88.5 | 88.5 | — |
| Calcium formate 100% | g | — | — | 2.5 | 2.5 |
| Dynamon SP1 | g | 4.5 | 4.5 | 4.5 | 2.0 |
| Spreading | mm. | 180 | 178 | 175 | 185 |
| Compressive strength 7 hours | MPa | 14.5 | 7.8 | 8.0 | 1.4 |
| Compressive strength 24 hours | MPa | 30.0 | 30.1 | 29.8 | 29.5 |

As will be seen from the results in Table 2, Mix 1, containing the admixture of Example 1 of the invention, is the one that develops mechanical strength most rapidly (14.5 MPa after 7 hours' curing). The product of Comparative Example 1, used in Mix 2, was synthesised without calcium formate and, after 7 hours' curing, develops about half the mechanical strength of the product according to the invention (7.8 MPa after 7 hours' curing). The addition of an amount of calcium formate equivalent to that introduced with the product of Example 1 (2.5 g) to the product of Comparative Example 1 does not substantially alter the development of mechanical strength, increasing the mechanical strength value after 7 hours from 7.8 MPa to 8.0 MPa. The modest contribution of calcium formate added

TABLE 3

Recipes of the syntheses conducted by replacing calcium formate with other substances and mixtures thereof, and comparison with the recipe based on calcium nitrate

| Recipe no. | COMPOSITION | | | | | | % dry matter content |
|---|---|---|---|---|---|---|---|
| | H2O | 52.5R cement | CaAc | DEA 85% | TEA 85% | CaN | |
| 3A | 1400 | 560 | 56 | — | — | | 33 |
| 3B | 1390 | 560 | — | 66 | — | | 32 |

TABLE 3-continued

Recipes of the syntheses conducted by replacing calcium formate with other substances and mixtures thereof, and comparison with the recipe based on calcium nitrate

| Recipe no. | COMPOSITION | | | | | % dry matter content |
|---|---|---|---|---|---|---|
| | H2O | 52.5R cement | CaAc | DEA 85% | TEA 85% | CaN | |
| 3C | 1390 | 560 | — | — | 66 | — | 33 |
| 3COMP | 1400 | 560 | — | — | — | 56 | 32 |

Table 4 below shows the characteristics of the mortars made with the products synthesised according to the recipes in Table 3.

TABLE 4

Composition and characteristics of plastic mortars containing the admixtures according to the invention produced with carboxylic acids and ethanolamines, by comparison with an admixture produced with calcium nitrate (Example 3COMP)

| Ingredient | Unit of measurement | Parameter | | | | |
|---|---|---|---|---|---|---|
| | | Mix 5 | Mix 6 | Mix 7 | Mix 8 | Mix 9 |
| 52.5R cement | g | 450 | 450 | 450 | 450 | 450 |
| Standard sand | g | 1350 | 1350 | 1350 | 1350 | 1350 |
| Water | g | 129.8 | 128.1 | 125.2 | 128.1 | 125.2 |
| Example 1 (CaF) | g | 93.5 | — | — | — | — |
| Example 3a (CaAc) | g | — | 90.9 | — | — | — |
| Example 3b (MEA) | g | — | — | 93.8 | — | — |
| Example 3c (TEA) | g | — | — | — | 90.9 | — |
| Example 3COMP (CaN) | g | — | — | — | — | 93.8 |
| Dynamon SP1 | g | 4.5 | 4.5 | 4.5 | 4.5 | 4.5 |
| Spreading | Mm | 180 | 178 | 175 | 185 | 186 |
| Compressive 7 hours strength | MPa | 14.5 | 15.2 | 13.8 | 14.6 | 7.1 |
| 24 hours | MPa | 30.0 | 30.1 | 29.8 | 29.5 | 30.2 |

As will be seen from the results of Table 4, the mixes made with the admixtures produced with calcium acetate, monoethanolamine and triethanolamine all develop very high mechanical strengths at short curing times (7 hours), which are identical to those of calcium acetate. Admixture 3COMP, though produced with calcium nitrate, one of the most potent cement accelerators, develops much lower mechanical strengths, identical to those of the product synthesised with water only (Comparative Example 1, Table 2, Mix 2).

EXAMPLE 4

56 g of calcium formate was dissolved in 1400 g of water at room temperature (22° C.), and the resulting solution was maintained under stirring with a mechanical stirrer in a 2000 ml glass beaker until the calcium formate was completely dissolved. 560 g of Portland cement type 52.5R, having the characteristics reported in Table 1, was added to said solution in 30 seconds. The hydration reaction is continued, under stirring, at the temperature of 22° C. for 288 hours. During the reaction, the product remains in the form of a fluid suspension, the grey colour of which tends to become paler over time. At the end of the reaction, the product is transferred to a plastic container. About 2000 g of product is obtained, with a 40% dry matter content measured at 105° C. to a constant weight.

A 5 g aliquot of the product was centrifuged to separate the aqueous phase. The solid material that separated was repeatedly washed with acetone to inhibit the hydration reactions, and left to dry for 15 minutes in a stove at 60° C., obtaining a pale grey dry powder.

COMPARATIVE EXAMPLE 2

560 g of the 52.5R cement of Table 1 was added to 1400 g of water at 22° C. by the same procedure as described in Example 1. The hydration reaction is continued, under stirring, for 288 hours, at the temperature of 22° C. During the reaction, the product remains in the form of a fluid suspension, the grey colour of which tends to become paler over time. At the end of the reaction, the product is transferred to a plastic container. About 1950 g of product is obtained, with a 37% dry matter content measured at 105° C. to a constant weight.

A 5 g aliquot of the product was centrifuged to separate the aqueous phase. The solid material that separated was repeatedly washed with acetone to inhibit the hydration reactions, and left to dry for 15 minutes in a stove at 60° C., obtaining a pale grey dry powder.

EXAMPLE 5

The samples of Example 4 and Comparative Example 2, after being centrifuged, washed with acetone and dried, were analysed by ESEM (Environmental Scanning Electron Microscope) for the microstructural analysis. The results are set out in the figures below. FIG. 1 shows an image of the product of Example 4, synthesised in the presence of 10% calcium formate to cement, while FIG. 2 shows an image of the product of Comparative Example 2, synthesised without calcium formate.

Comparison of the images in FIGS. 1 and 2 demonstrates the significant difference in the microstructures of the two products. In fact, whereas the product of Comparative Example-2 (FIG. 2), synthesised without calcium formate, takes the form of a set of particles with dimensions of a few microns, the product of Example 4 (FIG. 1), synthesised in the presence of 10% calcium formate, presents a completely different structure, wherein a very large number of submicron particles are associated with the larger particles. This result demonstrates the surprising effect of calcium formate in modifying the microstructure of the products of cement hydration during synthesis of the product according to the invention.

The specific surface area was measured by the BET technique on the same samples as used for the microstructural analysis in Example 4 and Comparative Example 2, using a Beckman-Coulter SA3100 instrument. The results of the analysis indicate a specific surface area value of 154 $m^2$/gram for the sample of Example 3 and a value of 27 $m^2$/gram for the sample of Comparative Example 2, demonstrating the huge increase in the specific surface area of the synthesised product in the presence of 10% calcium formate compared with that synthesised in pure water.

These differences have a significant effect on the accelerating properties of the two products, evaluated in plastic mortar tests with the products of Example 4 and Comparative Example 2. The tests were conducted by the same methods as reported in Example 2. The results are set out in Table 5 below.

TABLE 5

Composition and characteristics of plastic mortars containing the admixture of Example 4, and of the product of Comparative Example 2

| Ingredient | Unit of measurement | Parameter Mix 10 | Mix 11 |
|---|---|---|---|
| 52.5R cement | g | 450 | 450 |
| Standard sand | g | 1350 | 1350 |
| Water | g | 129.4 | 129.4 |
| Example 4 | gr. | 87.1 | — |
| Comparative Example 2 | gr. | — | 94.2 |
| Dynamon SP1 | gr. | 4.5 | 4.5 |
| Spreading | mm. | 180 | 178 |
| Compressive strength 6 hours | MPa | 13.4 | 1.3 |
| Compressive strength 7 hours | MPa | 17.5 | 2.2 |

As will be seen, mix 10, containing the admixture of Example 4 according to the invention, synthesised with 10% calcium formate, develops mechanical strengths after 6 and 7 hours' curing which are about 10 times greater than those of mix 11, made with the admixture of Comparative Example 2, synthesised in pure water.

EXAMPLE 6

112 g of calcium formate was dissolved in 1400 g of water at room temperature (22° C.), and the resulting solution was maintained under stirring with a mechanical stirrer in a 2000 ml glass beaker until the calcium formate was completely dissolved. 560 g of Portland cement type 52.5R, having the characteristics reported in Table 1, was added to this solution in 30 seconds. The hydration reaction is continued, under stirring, at the temperature of 22° C. for 60 hours. During the reaction, the product remains in the form of a fluid suspension, the grey colour of which tends to become paler over time. At the end of the reaction, the product is transferred to a plastic container. About 2000 g of product is obtained, with a dry matter content of 40%, measured at 105° C. to a constant weight.

COMPARATIVE EXAMPLE 3

100 g of 52.5 Portland cement having the characteristics reported in Table 1 was dispersed in 1000 ml of water at 22° C. and hydrated for 60 hours in an alumina jar with a volume of 8 litres, loaded with 4 kg of alumina balls having a diameter of between 20 mm and 40 mm. The rotation speed of the jar was 70 rpm, as reported in example A1 of U.S. Pat. No. 5,709,743. About 1100 g of a suspension of hydrated cement with a 13% dry matter content, measured at 105° C. to a constant weight, is obtained.

COMPARATIVE EXAMPLE 4

560 g of 52.5 Portland cement having the characteristics reported in Table 1 was dispersed in 1400 ml of water at 22° C. and hydrated for 60 hours in an alumina jar with a volume of 8 litres, loaded with 4 kg of alumina balls having a diameter of between 20 mm and 40 mm. The rotation speed of the jar was 70 rpm, as reported in example A1 of U.S. Pat. No. 5,709,743. About 1550 g of a suspension of hydrated cement with a 39% dry matter content, measured at 105° C. to a constant weight, is obtained.

EXAMPLE 7

The products of Example 6 and Comparative Examples 3 and 4 were tested in plastic mortar tests, using the same 52.5R Portland cement having the characteristics of Table 1.

The dose of the different admixtures was regulated to ensure that the same amount of admixture on a dry base, namely 5% of the weight of the cement, was added in all cases.

The superplasticising admixture Dynamon SP1 (Mapei) was used to achieve the desired workability. All the mixes were made with a water/cement ratio=0.42, counting any water introduced with the admixtures as mix water in the various cases. After the spreading measurement, prismatic specimens with dimensions of 4 cm×4 cm×16 cm were made the mortars, and left to cure under standard laboratory conditions (20° C. and 95% R/H). The compressive strengths were measured after 6 and 7 hours' curing, and the results are set out in Table 6 below.

TABLE 6

Composition and characteristics of plastic mortars containing the admixture of Example 6 of the invention and of Comparative Examples 3 and 4, produced according to the teachings of U.S. Pat. No. 5,709,743

| Ingredient | Unit of measurement | Parameter Mix 12 | Mix 13 | Mix 14 |
|---|---|---|---|---|
| 52.5R cement | g | 450 | 450 | 450 |
| Standard sand | g | 1350 | 1350 | 1350 |
| Water | g | 155.2 | 38.5 | 153.8 |
| Example 6 | g | 56.3 | — | — |
| Comparative Example 3 | g | — | 173.0 | — |
| Comparative Example 4 | g | — | — | 57.7 |
| Dynamon SP1 | g | 4.5 | 4.5 | 4.5 |
| Spreading | mm | 180 | 178 | 185 |
| Compressive strength 6 hours | MPa | 4.5 | 2.0 | 0.3 |
| Compressive strength 7 hours | MPa | 8.6 | 4.2 | 1.2 |

The results set out in Table 6 demonstrate that the product of Example 6 accelerates the development of mechanical strength at short curing times (6 and 7 hours) to a greater extent than the products of Comparative Examples 3 and 4, synthesised according to the teachings of U.S. Pat. No. 5,709,743, which involve increasing the fineness of the product by means of the wet grinding process during the cement hydration stage.

EXAMPLE 8

112 g of calcium formate was dissolved in 1400 g of water at 60° C., and the resulting solution was maintained under stirring, with a mechanical stirrer, in a 2000 ml glass beaker, until the calcium formate was completely dissolved. 560 g of Portland cement type 52.5R, having the characteristics reported in Table 1, was added to this solution in 30 seconds, at the temperature of 60° C. The hydration reaction was continued, under stirring, for 8 hours. Throughout the reaction, the product remains in the form of a fluid suspension, the grey colour of which tends to become paler over time. At the end of the reaction, the product is cooled and transferred to a plastic container. About 2050 g of a fluid aqueous dispersion is obtained, with a dry matter content of 39%, measured at 105° C. to a constant weight.

EXAMPLE 9

The product of Example 8 was used to make cementitious mixes wherein the cement was progressively replaced with fly ash originating from fossil-fuel thermocombustion plants. Said by-products are used to partly replace cement in cementitious mixes, as they are supplementary cementitious materials which, in turn, form cementing products very similar to the calcium silicate hydrate C-S-H deriving from cement. The benefit of using fly ash in cementitious mixes is the lower environmental impact deriving from the lower dose of cement, and the improvement that said by-products produce in the durability of the cementitious conglomerates. However, the reaction of the fly ash in the cementitious mixes develops more slowly; consequently, although at long curing times (90 days and over) it produces mechanical strengths very similar to those of mixes based on cement only, the short-term strengths are much lower, thus making it impossible to strike the formworks containing the fresh concrete rapidly, and therefore delaying the progress of the work. Thus although it is desirable to introduce large amounts of fly ash into cementitious mixes, the proportion of 15-20% of the weight of the cement should not be exceeded for the reasons stated above.

The cement used to make plastic mortars was the same 52.5R cement as in Table 1, while the composition of the fly ash used, classifiable as type F according to standard ASTM C618, is set out in Table 7 below.

TABLE 7

Composition of fly ash used to make plastic mortars, partly replacing Portland cement

| Type ASTMC618 | % CaO | % $SiO_2$ | % $Al_2O_3$ | % MgO | Density g/cm³ |
|---|---|---|---|---|---|
| F | 18.1 | 38.8 | 14.7 | 3.3 | 2.1-3.0 |

The superplasticising admixture Dynamon SP1 (Mapei) was used to achieve the desired workability. All the mixes were made with a water/binder ratio W/B=0.42, where "binder" means the sum of the cement and the fly ash. The mixing water was calculated by including the water introduced into the mix with the product of Example 8, having a dry weight of 39%.

After the spreading measurement, prismatic specimens with dimensions of 4 cm×4 cm×16 cm were made, and left to cure under standard laboratory conditions (20° C. and 95% R/H). Their compressive strength was measured after 7 hours', 24 hours' and 90 days' curing. The results are set out in Table 8 below.

TABLE 8

Composition and characteristics of plastic mortars made with the product of Example 8 containing various amounts of fly ash instead of cement

| | Mix composition (grams) | | | | | | | Flow rate | Compressive strength (MPa) | | |
|---|---|---|---|---|---|---|---|---|---|---|---|
| Mix no. | 52.5R CEMI | Fly ash F | Example 8 (dry matter 39%) | Standard sand | H2O | Dynamon SP1 | W/B | (mm) | 7 h | 24 h | 90 days |
| 15 | 450 | 0 | 0 | 1350 | 189 | 3.0 | 0.42 | 220 | 1.2 | 37.0 | 55 |
| 16 | 308 | 142 | 90 | 1350 | 108 | 5.3 | 0.42 | 190 | 7.3 | 27.0 | 57 |
| 17 | 250 | 200 | 90 | 1350 | 108 | 4.8 | 0.42 | 195 | 4.3 | 20.5 | 52 |
| 18 | 150 | 300 | 90 | 1350 | 108 | 4.0 | 0.42 | 200 | 1.2 | 17.5 | 53 |
| 19 | 308 | 142 | 0 | 1350 | 189 | 2.5 | 0.42 | 210 | 0 | 12.5 | 52 |

The results of the plastic mortar tests shown in Table 8 indicate that the admixture according to the invention accelerates the development of mechanical strengths at short curing times (7 hours), even in mixes containing large proportions of fly ash, without affecting their final long-term strength (90 days). In fact, in the presence of the accelerator of Example 8, it is possible not only to eliminate the delay at short curing times caused by the introduction of fly ash into cementitious mixes, but also to increase the value thereof, unlike with the mix made with Portland cement only. In fact, by replacing 32% of cement with fly ash, the strength after 7 hours increases from 1.2 MPa (Mix 15) to 7.3 MPa (Mix 16), and by replacing 44% thereof it increases .to 4.3 MPa (Mix 17). For replacement values of 67% (Mix 18), the compressive strength after 7 hours of curing is the same as that of the reference mix with Portland cement only (Mix 15). In the absence of the accelerator of Example 8 according to the invention, it is impossible after 7 hours, because it is still too soft (Mix 19).

EXAMPLE 10

The product of Example 8 was used to make cementitious mixes wherein the cement was progressively replaced by ground-granulated blast-furnace slag (GGBFS). Said by-products are used to partly replace cement in cementitious mixes, as they are supplementary cementitious materials which, in turn, form cementing products very similar to the calcium silicate hydrate C-S-H deriving from cement. The benefit of using GGBFS in cementitious mixes, as in the case of fly ash, is the lower environmental impact deriving from the lower dose of cement, and the improvement that said by-products produce in the durability of the cementitious conglomerates. However, the reaction of the slag in the cementitious mixes develops more slowly; consequently, although at long curing times (90 days and over) it produces mechanical strengths very similar to those of mixes based on cement only, the short-term strengths are much lower, thus making it impossible to strike the formworks containing the fresh concrete rapidly, and therefore delaying the progress of the work. Thus, although it is desirable to introduce large amounts of GGBFS into cementitious mixes, the proportion of 15-20% of the weight of the cement should not be exceeded for the reasons stated above.

The cement used to make the plastic mortars was the same 52.5R cement as in Table 1, while the composition of the slag used is reported in Table 9 below.

TABLE 9

Composition of the ground-granulated blast-furnace slag (GGBFS) used to make the plastic mortars, partly replacing Portland cement

| Main ingredients | | | | Density |
|---|---|---|---|---|
| % CaO | % $SiO_2$ | % $Al_2O_3$ | % MgO | $g/cm^3$ |
| 40.3 | 35.1 | 13.6 | 8.4 | 2.9 |

The superplasticising admixture Dynamon SP1 (Mapei) was used to achieve the desired workability. All the mixes were made with a water/binder ratio W/B=0.42, where "binder" means the sum of the cement and the slag. The mix water was calculated by including the water introduced into the mix with the product of Example 7, having a dry weight of 39%. After the spreading measurement, prismatic specimens with dimensions of 4 cm×4 cm×16 cm were made, and left to cure under standard laboratory conditions (20° C. and 95% R/H). Their compressive strength was measured after 7 hours', 24 hours' and 90 days' curing. The results are set out in Table 10 below.

TABLE 10

Composition and characteristics of plastic mortars made with the product of Example 8 containing various amounts of GGBFS instead of cement

| Mix composition (grams) | | | | | | | | Flow | Compressive | | |
|---|---|---|---|---|---|---|---|---|---|---|---|
| | 52.5R | | Example 8 (dry matter | Standard | | Dynamon | | rate | strength (MPa) | | |
| Mix no. | CEMI | GGBFS | 42.6%) | sand | H2O | SP1 | A/P | (mm) | 7 h | 24 h | 90 days |
| 15 | 450 | 0 | 0 | 1350 | 189 | 3.0 | 0.42 | 220 | 1.2 | 37.0 | 55 |
| 20 | 308 | 142 | 90 | 1350 | 108 | 5.3 | 0.42 | 210 | 9.8 | 29.8 | 57 |
| 21 | 250 | 200 | 90 | 1350 | 108 | 4.8 | 0.42 | 200 | 5.5 | 24.3 | 52 |
| 22 | 150 | 300 | 90 | 1350 | 108 | 5.5 | 0.42 | 215 | 1.6 | 20.0 | 53 |
| 23 | 308 | 142 | 0 | 1350 | 189 | 4.3 | 0.42 | 205 | 0 | 17.5 | 54 |

The results of the mortar tests shown in Table 10 indicate that the admixture of Example 8 of the invention accelerates the development of mechanical strength at short curing times (7 hours) even in mixes containing large amounts of slag, without prejudicing their final long-term strength (90 days). In fact, in the presence of the accelerator of Example 8, it is possible not only to eliminate the delay at short curing times caused by the introduction of slag into cementitious mixes, but also to increase the mechanical strength value at short curing times (7 hours), unlike with the mix made with Portland cement only. In fact, if 32% of the cement is replaced with slag, the strength after 7 hours increases from 1.2 MPa (Mix 15) to 9.8 MPa (Mix 20), and if 44% is replaced, it increases to 5.5 MPa (Mix 21). For replacement values of 67% (Mix 22), the compressive strength after 7 hours' curing is still greater than that of the reference mix with Portland cement only (Mix 15). In the absence of the accelerator of Example 8 according to the invention, demoulding is impossible after 7 hours, because the specimen is still too soft (Mix 23).

EXAMPLE 11

112 g of calcium formate was dissolved in 1700 g of water at 60° C., and the resulting solution was maintained under stirring, with a mechanical stirrer, in a 2000 ml glass beaker, until the calcium formate was completely dissolved. 560 g of Portland cement type 52.5R, having the characteristics reported in Table 1, was added to this solution in 30 seconds, at the temperature of 60° C. The hydration reaction was continued, under stirring, for 8 hours. Throughout the reaction, the product presents in the form of a fluid suspension, the grey colour of which tends to become paler over time. At the end of the reaction, the product is cooled and transferred to a plastic container. About 2370 g of a fluid aqueous dispersion is obtained, with a dry matter content of 34%, measured at 105° C. to a constant weight, and a viscosity of 2000 cP, measured at 20° C.

The product resulting from synthesis was divided into 3 aliquots of 750 g each. One of them was maintained unchanged, while different aliquots of powdered sodium carbonate $Na_2CO_3$ were added to the other two. The addition took place under stirring, adding the powdered carbonate to the aqueous suspension of the admixture in 10 minutes. The addition of sodium carbonate produced an increase in the viscosity of the aqueous suspension. Stirring continued for 30 minutes after the end of the addition. The samples reported in Table 11 below were produced.

TABLE 11

Description of samples containing various aliquots of sodium carbonate $Na_2CO_3$

| Sample | Example 11 (g) | $Na_2CO_3$ (g) | % $Na_2CO_3$ (*) |
|---|---|---|---|
| 11 tq | 750 | 0 | 0 |
| 11 NC1 | 750 | 20 | 7.8 |
| 11 NC2 | 750 | 40 | 15.7 |

(*) $Na_2CO_3$ as a percentage of the dry fraction of the admixture of Example 11 (34%).

EXAMPLE 12

The samples of Example 11 were used to make cementitious mixes wherein the cement was completely replaced by fly ash originating from fossil-fuel thermocombustion plants, classifiable as type F according to standard ASTM C618, and having the composition reported in Table 7. The superplasticising admixture Dynamon SP1 (Mapei) was used to achieve the desired workability. After the spreading measurement, prismatic specimens with dimensions of 4 cm×4 cm×16 cm were made, and left to cure under standard laboratory conditions (20° C. and 95% R/H). Their compressive strength was measured after 7 and 28 days' curing. The results are set out in Table 12 below.

TABLE 12

Composition and characteristics of plastic mortars based on fly ash made with the products of Example 11

| Mix no. | Fly ash F | Admixture | Standard sand | $H_2O$ | Dynamon SP1 | W/B (*) | Flow rate (mm) | Compressive strength (MPa) 7 days | 28 days |
|---|---|---|---|---|---|---|---|---|---|
| 24 | 450 | None | 0 | 1350 | 100 | 5.0 | 0.22 | 200 | 0 | 0 |
| 25 | 450 | 11 tq | 264.7 | 1350 | 30 | 5.0 | 0.45 | 190 | 0.9 | 2.5 |
| 26 | 450 | 11 NC1 | 264.7 | 1350 | 30 | 5.0 | 0.45 | 195 | 1.3 | 4.3 |
| 27 | 450 | 11 NC2 | 264.7 | 1350 | 30 | 5.0 | 0.45 | 200 | 3.5 | 9.8 |
| 28 | 450 | $Na_2CO_3$ | 14.1 | 1350 | 100 | 5.0 | 0.22 | 180 | 0 | 0 |

(*) The water/binder ratio W/B was calculated by including in the calculation the water introduced into the mix with the product of Example 11, having a dry matter content of 34%

The results of the plastic mortar tests in Table 12 demonstrate the favourable effect on the development of mechanical strength produced by the combination of the admixture of Example 11 with sodium carbonate. Fly ash alone does not exhibit any hydraulic properties; in fact, mix no. 24, based on fly ash only, does not develop mechanical strength, even after 28 days' curing. The addition of the admixture of Example 11, without sodium carbonate, produces modest activation of the fly ash (2.5 MPa after 28 days' curing, mix no. 25). The combination of sodium carbonate with the admixture according to the invention progressively improves the compressive strength of the specimens (mix nos. 26 and 27); this result is definitely surprising, bearing in mind that sodium carbonate alone, added at the same dose as in mix no. 27, makes no contribution whatever to the development of the mechanical strength of fly ash (mix no. 28).

EXAMPLE 13

The samples of Example 11 were used to make cementitious mixes wherein the cement was completely replaced by ground-granulated blast-furnace slag (GGBFS) having the composition set out in Table 9. The superplasticising admixture Dynamon SP1 (Mapei) was used to achieve the desired workability. After the spreading measurement, prismatic specimens with dimensions of 4 cm×4 cm×16 cm were made, and left to cure under standard laboratory conditions (20° C. and 95% R/H). Their compressive strength was measured after 24 hours', 7 and 28 days' curing. The results are set out in Table 13 below.

TABLE 13

Composition and characteristics of GGBSF-based plastic mortars made with the products of Example 11

| Mix no. | Mix composition (grams) | | | | | Flow | Compressive strength (MPa) | | |
| | GGBFS | Admixture | Standard sand | $H_2O$ | Dynamon SP1 | W/B (*) | rate (mm) | 24 h | 7 days | 28 days |
|---|---|---|---|---|---|---|---|---|---|---|
| 29 | 450 | None | 0 | 1350 | 200 | 4.0 | 0.44 | 210 | 0 | 0 | 0 |
| 30 | 450 | 11 tq | 264.7 | 1350 | 80 | 4.0 | 0.57 | 170 | 1.1 | 15.1 | 21.9 |
| 31 | 450 | 11 NC1 | 264.7 | 1350 | 80 | 4.0 | 0.57 | 180 | 1.3 | 13.6 | 20.2 |
| 32 | 450 | 11 NC2 | 264.7 | 1350 | 80 | 4.0 | 0.57 | 195 | 6.5 | 14.3 | 19.8 |
| 33 | 450 | $Na_2CO_3$ | 14.1 | 1350 | 200 | 4.0 | 0.44 | 195 | 0 | 19.0 | 25.0 |

(*) The water/binder ratio W/B was calculated by including in the calculation the water introduced into the mix with the product of Example 11, having a dry matter content of 34%

The results of the plastic mortar tests in Table 13 demonstrate the favourable effect on the development of mechanical strength produced by the combination of the admixture according to the invention with sodium carbonate. As in the case of fly ash, blast-furnace slag alone does not exhibit any hydraulic properties; in fact, mix no. 29, based on GGBFS only, does not develop mechanical strength, even after 28 days' curing. The combination of sodium carbonate with the admixture according to the invention progressively improves the compressive strength of the specimens after 24 hours' curing (mix nos. 31 and 32). This result is definitely surprising, bearing in mind that sodium carbonate alone, added at the same dose as in mix no. 31, does not promote in any way the development of the mechanical strength of GGBFS after 24 hours (mix no. 33).

EXAMPLE 14

112 g of calcium formate was dissolved in 1653 g of water at 60° C., and the resulting solution was maintained under stirring, with a mechanical stirrer, in a 2000 ml glass beaker, until the calcium formate was completely dissolved. 75 g of a 37% aqueous solution of a polymer dispersing agent based on a copolymer of methacrylic acid and a polyoxyethylene ester of methacrylic acid, commonly used as superplasticiser for cementitious mixes, was then added. Said polymer is characterised by a weight-average molecular weight Mw, measured by gel permeation chromatography, amounting to Mw=80,000 daltons, ratio of acid groups to ester groups A/E=7, and polyoxyethylene chain length 5,000 daltons. 560 g of Portland cement type 52.5R, having the characteristics reported in Table 1, was added to the resulting clear solution in 30 seconds, at the temperature of 60° C. The hydration reaction was continued, under stirring, for 8 hours. Throughout the reaction, the product presents in the form of a fluid suspension, the grey colour of which tends to become paler over time. At the end of the reaction, the product is cooled and transferred to a plastic container. About 2400 g of a fluid aqueous dispersion is obtained, with a dry matter content of 33%, measured at 105° C. to a constant weight, and a viscosity of 400 cP, measured at 20° C. As will be seen, the presence of the dispersing polymer produces a considerable reduction in the viscosity of the end product, as is evident from a comparison with the product of Example 11, synthesised under the same conditions, but without the dispersing polymer.

COMPARATIVE EXAMPLE 5

150 g of a 37% aqueous solution of a polymer dispersing agent based on a copolymer of methacrylic acid and a polyoxyethylene ester of methacrylic acid, commonly used as superplasticiser for cementitious mixes, was added to 1607 g of water. Said polymer is characterised by a weight-average molecular weight Mw, measured by gel permeation chromatography, amounting to Mw=80,000 daltons, ratio of acid groups to ester groups A/E=7, and polyoxyethylene chain length 5,000 daltons. 560 g of Portland cement type 52.5R, having the characteristics reported in Table 1, was added to the resulting clear solution in 30 seconds, at the temperature of 60° C. The hydration reaction was continued, under stirring, for 8 hours. Throughout the reaction, the product presents in the form of a fluid suspension, the grey colour of which tends to become paler over time. At the end of the reaction, the product is cooled and transferred to a plastic container. About 2300 g of a fluid aqueous dispersion is obtained, with a dry matter content of 32%, measured at 105° C. to a constant weight, and a viscosity of 400 cP at 20° C.

EXAMPLE 15

The products of Example 14 and Comparative Example 5 were evaluated in plastic mortar tests, using the same 52.5R Portland cement having the characteristics of Table 1. A reference mix based on cement only was made by way of comparison.

The superplasticising admixture Dynamon SP1 (Mapei) was used to achieve the desired workability. All the mixes were made with a water/cement ratio=0.42, counting any water introduced with the admixtures as mix water in the various cases.

After the spreading measurement, prismatic specimens with dimensions of 4 cm×4 cm×16 cm were made the mortars, and left to cure under standard laboratory conditions (20° C. and 95% R/H). The compressive strengths were measured after 6, 8, 10 and 24 hours' curing, and the results are set out in Table 14 below.

TABLE 14

Composition and characteristics of the plastic mortars containing the admixture of Example 14 of the invention, by comparison with the product of Comparative Example 5 and the reference based on cement only

| | | Parameter | | |
|---|---|---|---|---|
| Ingredient | Unit of measurement | Mix 34 | Mix 35 | Mix 36 |
| 52.5R cement | g | 450 | 450 | 450 |
| Standard sand | g | 1350 | 1350 | 1350 |
| Water | g | 154 | 154 | 189 |
| Example 15 | g | 53 | — | — |
| Comparative Example 5 | g | — | 53 | — |
| Reference | g | — | — | — |
| Dynamon SP1 | g | 1.6 | 1.6 | 2.5 |
| Spreading | mm | 210 | 240 | 225 |
| Compressive 6 hours | MPa | 2.4 | 0 | 0.3 |
| strength 8 hours | MPa | 8.1 | 0.7 | 0.9 |
| 10 hours | MPa | 18.5 | 2.4 | 3.2 |
| 24 hours | MPa | 32.3 | 31.8 | 30.7 |

The results shown in Table 14 demonstrate that the accelerating effect of the admixture according to the invention is not substantially influenced by the addition of a polyethercarboxylate-based dispersing agent. In fact, mix 34, containing the admixture of Example 15, exhibits a considerable accelerating effect compared with the reference (Mix 36). Conversely, the mix containing the product of Comparative Example 5, based on the superplasticiser only (mix 35), demonstrates that the dispersing polymer alone does not exercise any accelerating effect, but actually causes an initial delay in hydration compared with the reference mix.

EXAMPLE 16

The samples of Example 14 and Comparative Example 5 were analysed by the XRPD technique, using a mod. PANalytical X'Pert Pro MPD diffractometer equipped with an X'Celerator detector. The samples were acquired by exposing the powders to Co-$K_{\alpha 1,2}$ radiation, generated by a Co anode with voltage of 40 kV and a current of 40 mA. The diffraction spectra are shown in FIG. 3. The spectrum of the sample corresponding to Example 14 is represented by the darker line in the upper part, while the spectrum relating to Comparative Example 5 is represented by the grey line below. As will be seen, the spectrum corresponding to the product of Example 14, synthesised in the presence of calcium formate, presents some peaks (6.78 Å, 5.20 Å and 4.14 Å) which are not present in the spectrum of the sample of Comparative Example 5, wherein calcium formate was not added during synthesis. However, said peaks do not correspond to the peaks of crystalline calcium formate, but are indexed consistently with a tetragonal or orthorhombic cell having a volume of 380-390 angstroms$^3$ or 790 angstroms$^3$, and are indicative of different polymorphic structures wherein the calcium cation is coordinated with the formate binder to create a three-dimensional crystalline structure typical of MOFs (Metal Organic Frameworks). The high porosity of these structures, confirmed by the enormous increase in the specific surface area of the products according to the present invention compared with those synthesised in pure water (see the BET data set out in Example 5), is believed to be the fundamental reason for the improved accelerating effect and the stability of the products according to the present invention.

The invention claimed is:

1. Accelerating admixture for hydraulic compositions based on calcium-silicate-hydrate gel (C-S-H) seeds, obtained with the process comprising
    hydrating in aqueous suspension a hydraulic binder based on Portland cement or other hydraulic binders with a mainly silicate base, with a water/binder ratio (W/B) ranging from W/B =1 to W/B=6, at a temperature ranging from 10° C. to 90° C., for times ranging from 2 hours to 300 hours, in the presence of carboxylic acids, the calcium salts thereof, monoethanolamine, isopropanolamine, polyethanolamines, or mixtures thereof,
    wherein dispersing, viscosity-controlling and stabilising agents are added during hydration or at the end of the hydration reaction, and wherein the dispersing agents comprise gluconic acid and the salts thereof, polyethercarboxylate-based polymers, lignin sulphonate, condensates of naphthalene sulphonate and melamine sulphonate with formaldehyde, and derivatives of polysaccharides and phosphonated polymers.

2. The accelerating admixture as claimed in claim 1, wherein the carboxylic acids are formic acid or acetic acid or the calcium salts thereof.

3. The accelerating admixture as claimed in claim 1, wherein the hydrating step is conducted in the presence of calcium formate.

4. The accelerating admixture as claimed in claim 1, wherein the polyethanolamines are selected from diethanolamine, triethanolamine, triisopropanolamine and diethanolisopropanolamine.

5. The accelerating admixture as claimed in claim 1, wherein the carboxylic acids and polyethanolamines are present in quantities ranging from 2% to 40% of the weight of Portland cement or other hydraulic binders with a mainly silicate base.

6. The accelerating admixture as claimed in claim 1, wherein the viscosity-controlling agents comprise polysaccharide derivatives selected from methylcellulose, hydroxyethylcellulose (HEC), hydroxypropylcellulose (HPC), methylhydroxyethylcellulose (MHEC), methylhydroxypropylcellulose (MHPC) and/or (co)polymers with an average molecular weight greater than 500,000 g/mol, containing structural units derived from non-ionic monomers of (meth)acrylamide and sulphonated monomers, or modified polyureas.

7. The accelerating admixture as claimed in claim 1, wherein the stabilizing agents comprise oxalic acid or hydroxycarboxylic acids selected from citric acid and malic acid or the salts thereof.

8. The accelerating admixture as claimed in claim 1, wherein the carboxylic acids and polyethanolamines are present in quantities ranging from 5% to 25% of the weight of Portland cement or other hydraulic binders with a mainly silicate base.

9. The accelerating admixture as claimed in claim 1, wherein the carboxylic acids and polyethanolamines are present in quantities ranging from 10% to 20% of the weight of Portland cement or other hydraulic binders with a mainly silicate base.

10. The accelerating admixture as claimed in claim 1, wherein the viscosity-controlling agents comprise polysaccharide derivatives selected from methylcellulose, hydroxyethylcellulose (HEC), hydroxypropylcellulose (HPC), methylhydroxyethylcellulose (MHEC), methylhydroxypropylcellulose (MHPC) and/or (co)polymers with an average molecular weight greater than 1,000,000 g/mol, containing structural units derived from non-ionic monomers of (meth)acrylamide and sulphonated monomers, or modified polyureas.

11. A process for the preparation of an accelerating admixture for hydraulic compositions based on C-S-H seeds, which comprises hydrating a hydraulic binder based on Portland cement or other hydraulic binders with a mainly silicate base, in the presence of carboxylic acids or the calcium salts thereof, polyethanolamines or mixtures thereof in aqueous suspension to obtain a suspension, wherein the hydrating step reaction of the binder in the aqueous solution is conducted in stirred tanks or reactors at atmospheric pressure, at temperatures ranging from 20° C. to 80° C. and wherein stirring is continuous or discontinuous, with anchor or rotor stirrers, optionally associated with ultradispersion systems.

12. The process as claimed in claim 11, further comprising adding sodium carbonate in quantities ranging from 3% to 40% of the dry weight of the suspension to the suspension resulting from the hydrating step.

13. The process as claimed in claim 11, further comprising adding sodium carbonate in quantities ranging from 5% to 30% of the dry weight of the suspension to the suspension resulting from the hydrating step.

14. The process as claimed claim 11, further comprising adding sodium carbonate in quantities ranging from 10% to 20% of the dry weight of the suspension to the suspension resulting from the hydrating step.

* * * * *